United States Patent [19]

Van Veldhuizen

[11] 4,068,606

[45] Jan. 17, 1978

[54] SURFACE EFFECTS AIR VEHICLE

[76] Inventor: John Van Veldhuizen, 25975 SW. 182 Ave., Homestead, Fla. 33030

[21] Appl. No.: 732,991

[22] Filed: Oct. 15, 1976

[51] Int. Cl.$^2$ .............................................. B63B 1/34
[52] U.S. Cl. .................................. 114/67 A; 180/116
[58] Field of Search ......................... 114/67 R, 67 A; 115/1 C; 180/116, 117, 119–121, 124–129

[56] References Cited

U.S. PATENT DOCUMENTS

| | | | |
|---|---|---|---|
| 1,710,869 | 4/1929 | Farrell | 115/1 C |
| 3,365,018 | 1/1968 | Bliss | 180/121 |
| 3,399,644 | 9/1968 | Hunt | 114/67 A |
| 3,524,517 | 8/1970 | Fleur | 180/119 |
| 3,595,336 | 7/1971 | Perez | 180/116 |
| 3,714,918 | 2/1973 | Veldhuizen | 114/67 A |
| 3,765,357 | 10/1973 | Peri | 114/67 A |
| 3,903,832 | 9/1975 | Ishida | 114/67 A |
| 3,908,783 | 9/1975 | Joerg et al. | 114/67 A |

FOREIGN PATENT DOCUMENTS

| 1,146,774 | 4/1963 | Germany | 114/67 A |
|---|---|---|---|

Primary Examiner—Trygve M. Blix
Assistant Examiner—Stuart M. Goldstein
Attorney, Agent, or Firm—Clarence A. O'Brien; Harvey B. Jacobson

[57] ABSTRACT

A vehicle including a rigid body is provided and includes a bottom structure defining a plurality, elongated and horizontally downwardly projecting bottom surface members which in turn define downwardly opening channels therebetween. The bottom structure further includes a plurality of elongated horizontal flexible inflatable members disposed and extending along between pairs of adjacent bottom surface members in the aforementioned channels. The body includes structure operative to apply fluid under pressure to the inflatable members to inflate the latter and the inflatable members, when inflated, include portions projecting downwardly below the bottom surface members. The undersurface portions of the inflatable members which project below the bottom surface members include structure defining friction brake surfaces and the vehicle also includes structure operative to downwardly discharge air under pressure below and between the bottom surface member for buoying the vehicle on a cushion of air beneath the bottom structure thereof, the friction brake surfaces of the inflatable members, when the latter are inflated, being projected downwardly below the bottom surface members to an extent greater than the effective height of the air cushion formed beneath the bottom structure whereby the friction brake surfaces may friction brake the vehicle to a stop.

14 Claims, 8 Drawing Figures

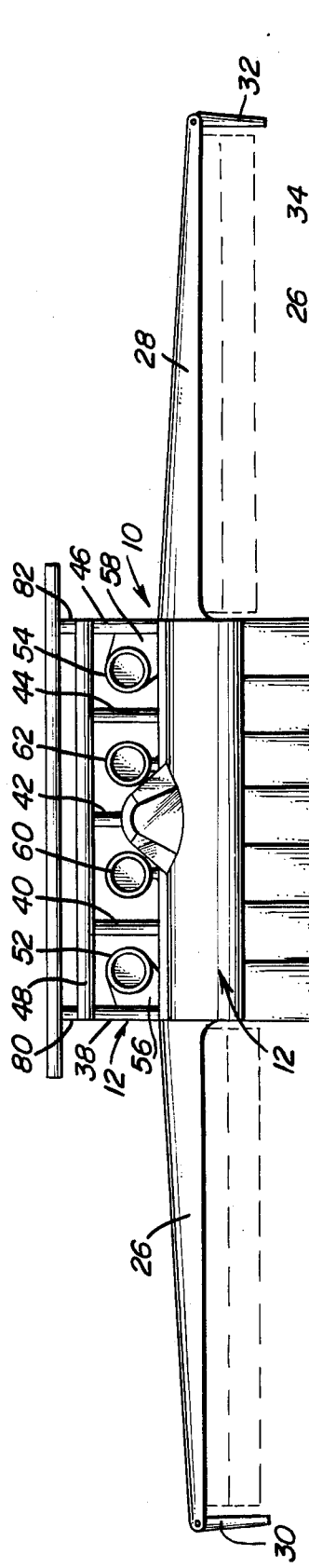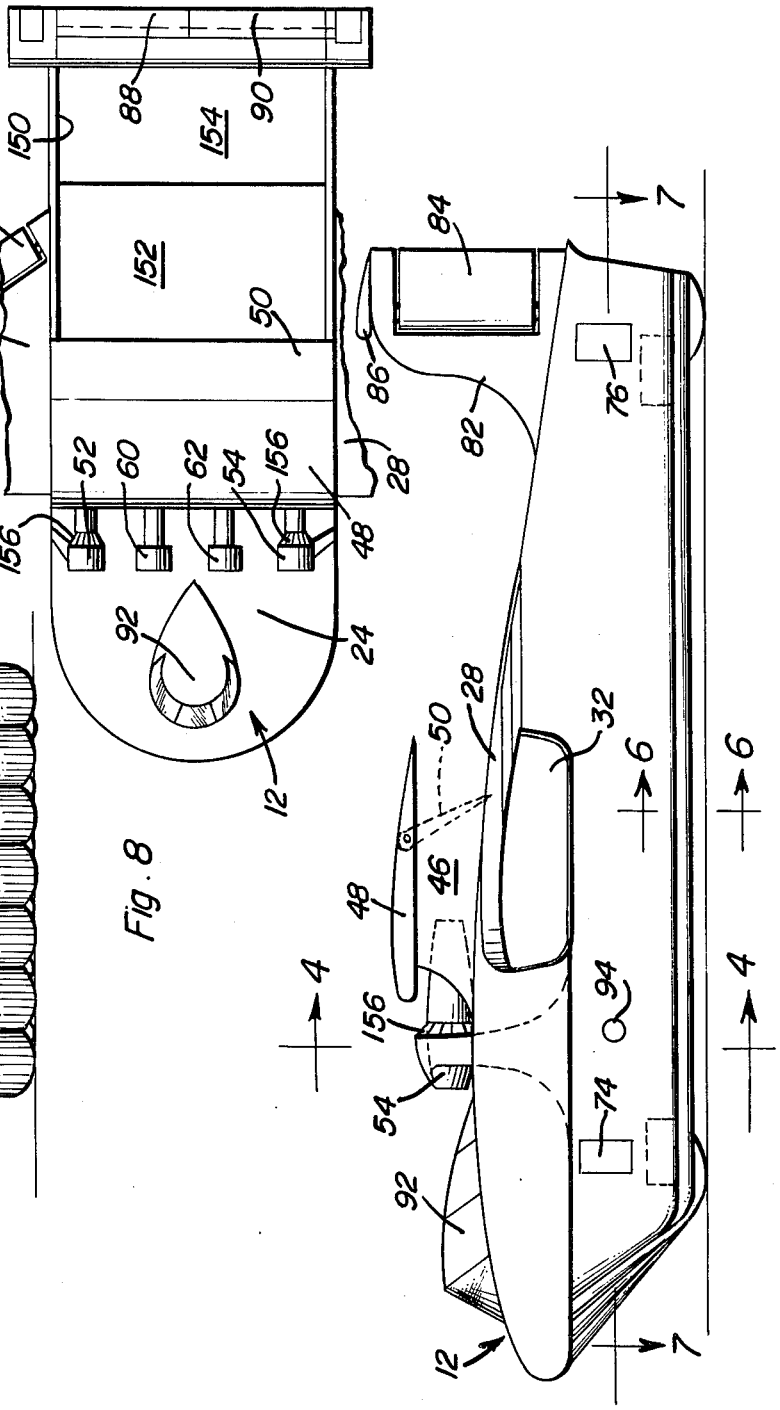

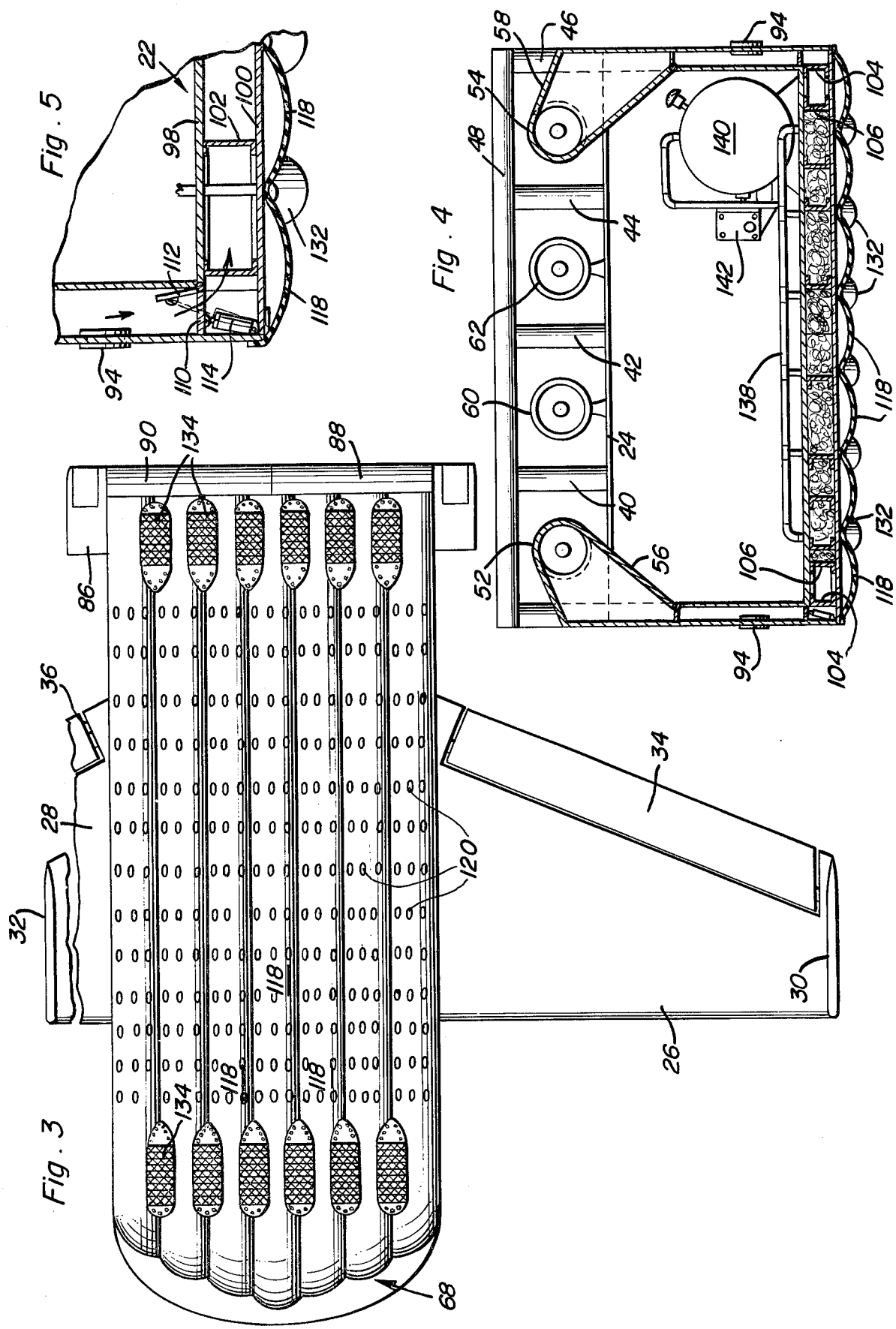

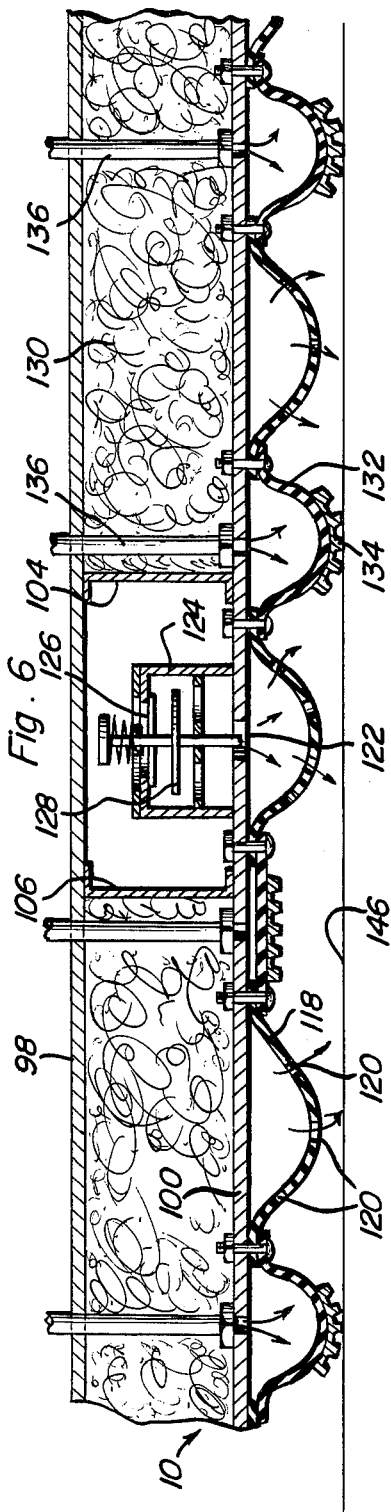
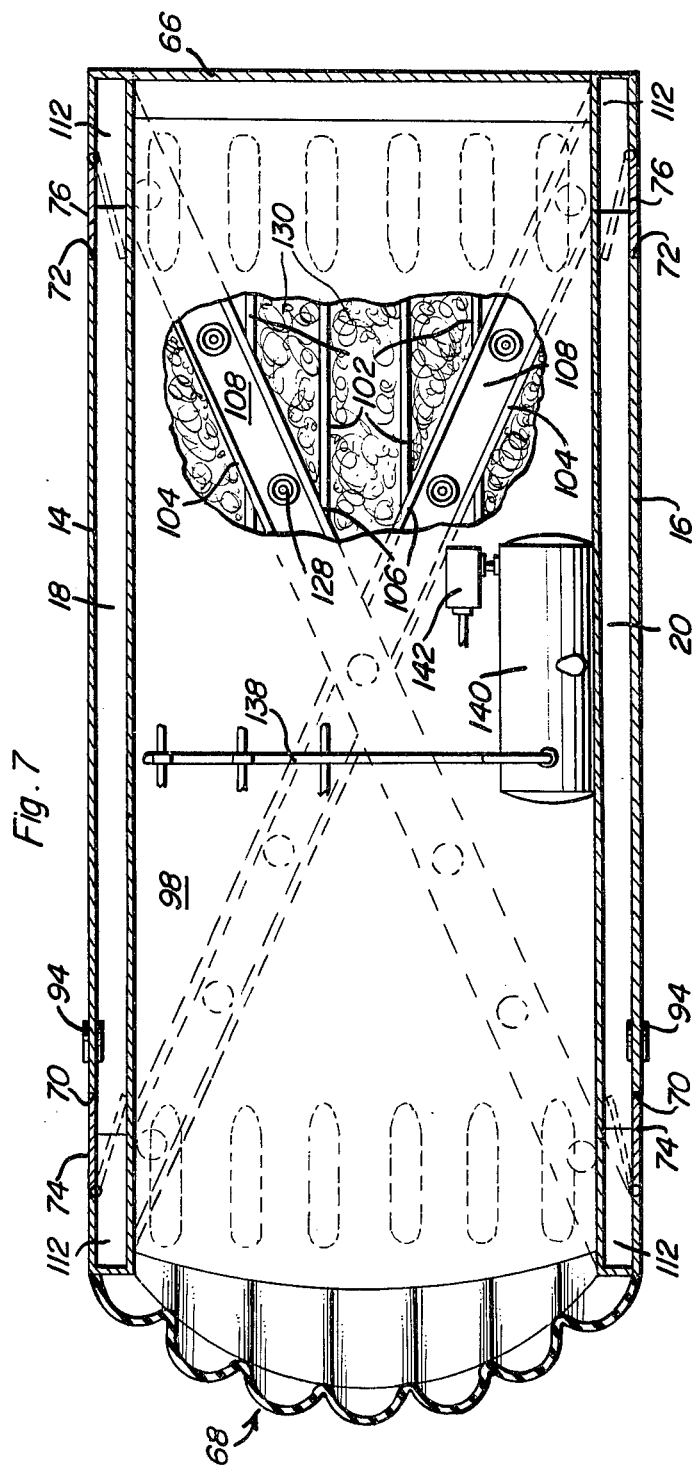

SURFACE EFFECTS AIR VEHICLE

BACKGROUND OF THE INVENTION

This invention comprises an improvement over the somewhat similar vehicles disclosed in my prior U.S. Pat. Nos: 3,332,389, 3,598,077 and 3,521,560.

The similar vehicles disclosed in my prior U.S. patents are not capable of flight through the air and are not capable of positive ground contacting braking. Accordingly, the air vehicle of the instant invention has been constructed in a manner to provide both air flight capabilities and ground contact braking means.

BRIEF DESCRIPTION OF THE INVENTION

The vehicle of the instant invention is constructed to be operative as an air cushion vehicle for use over water as well as land and also has air flight capabilities whereby it may be flown in the manner of a conventional fixed wing aircraft.

The main object of this invention is to provide a truly multipurpose vehicle which may be operated over water, over land and through the air.

Another object of this invention, in accordance with the immediately preceding object, is to provide a vehicle including a plurality of similar engines which are operative not only to propel the vehicle over land, over water and through the air, but which are also operative to provide the necessary air cushion for movement over water and land and also the power source for actuating the friction braking structure of the vehicle when the latter is being used over land as an air cushion vehicle.

Yet another important object of this invention is to provide a vehicle including a main body or fuselage portion which itself defines an air foil for providing supplemental lift when the vehicle is operated in the manner of an aircraft.

A further object of this invention is to provide a vehicle including a fuselage of considerable internal volume and which, therefore, may be utilized to transport bulky as well as heavy loads.

A final object of this invention is to provide a multipurpose vehicle, in accordance with the preceding objects, and which will conform to conventional forms of manufacture, be of simple construction and easy to operate so as to provide a device that will be economically feasible, long lasting and relatively trouble-free in operation. These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a front elevational view of the vehicle of the instant invention with the flaps of the wing portions thereof illustrated in a fully downward position in phantom lines;

FIG. 2 is a side elevational view of the vehicle;

FIG. 3 is a fragmentary bottom plan view of the vehicle;

FIG. 4 is an enlarged fragmentary, transverse, vertical sectional view taken substantially upon the plane indicated by the section line 4—4 of FIG. 2;

FIG. 5 is a fragmentary, enlarged, transverse, vertical sectional view illustrating the manner in which air ducted from two of the turbofan engines of the vehicle into the side plenums thereof may be controllably ducted into the bottom structure of the vehicle in order to form an air cushion therefor for movement of the vehicle over land as well as water;

FIG. 6 is an enlarged, transverse, vertical sectional view illustrating the bottom structure of the vehicle and the manner in which the air cushion therefor may be formed and also the manner in which the friction brake structure may be pneumatically actuated;

FIG. 7 is an enlarged, horizontal, sectional view taken substantially upon the plane indicated by the section line 7—7 of FIG. 2 and with upper portions of the bottom structure being broken away; and FIG. 8 is a fragmentary, top plan view of the vehicle.

DETAILED DESCRIPTION OF THE INVENTION

Referring now more specifically to the drawings, the numeral 10 generally designates the vehicle of the instant invention. The vehicle 10 includes a main body or fuselage referred to in general by the reference numeral 12 and including outer opposite side longitudinal walls 14 and 16 defining air plenums 18 and 20, a bottom structure referred to in general by the reference numeral 22 and an upper wall 24. It will be noted from FIG. 2 of the drawings that the fuselage or body 12 is generally in the form of an air foil and that the body 12 will thus provide some lift when the vehicle is being operated in the manner of an aircraft and moving forwardly at high speed through the atmosphere.

The opposite side walls 14 and 16 include horizontally outwardly projecting wing structures 26 and 28 and the outer ends of the wing structures 26 and 28 include downwardly directed air channelling winglets 30 and 32. Further, the trailing edges of the wing structures 26 and 28 include wing flaps 34 and 36 of conventional design.

The fuselage or body 12 additionally includes a plurality of upstanding and transversely spaced braces 38, 40, 42, 44 and 46 from which a short elevated wing section 48 is supported, the wing section 48 including a downwardly swingable flap 50 for closing the rear ends of the front to rear extending spaces or channels defined between adjacent pairs of the braces 38, 40, 42, 44 and 46.

A first pair of high-bypass-ratio turbofan engines 52 and 54 are supported from the inner sides of the braces 38 and 46 and ducts 56 and 58 are provided for the engines 52 and 54 for ducting the bypass air therefrom downwardly into the plenums 18 and 20. In addition, a second pair of high-bypass-ratio turbofan engines 60 and 62 are supported from the upper wall 24 between the braces 40 and 42 and the braces 42 and 44 and have as their sole purpose forward propulsion of the vehicle 10. The main thrust of the engines 52 and 54 is also utilized for forward propulsion of the vehicle 10, but the bypass air ducted therefrom into the plenums 18 and 20 is utilized for different purposes as will be hereinafter more fully set forth.

The rear end of the body 12 is closed by means of a rear downwardly swingable ramp 66 similar to that disclosed in my prior U.S. Pat. No. 3,332,389. Further, the forward end of the body 12 is closed by means of an inflatable bow structure referred to in general by the reference numeral 68 similar to that disclosed in my U.S. Pat. No. 3,598,077. Still further, the outer sides of the side walls 14 and 16 include front and rear openings 70 and 72 with which horizontally inwardly swingable doors 74 and 76 are operatively associated, which openings and doors are similar to those disclosed in my prior U.S. Pat. No. 3,521,560.

The rear of the body 12 includes upstanding opposite side stationary vertical stabilizers 80 and 82 equipped with horizontally swingable rudders 84 and interconnected at their upper ends by means of a horizontal stationary stabilizer 86. Further, the upper horizontal stabilizer 86 includes hinged elevator flaps 88 and 90.

The flaps 34 and 36 as well as the elevators 88 and 90 and the rudders 84 may be controlled by conventional pilot controls housed within the forward cockpit 92 of the body 12.

In addition to the openings 70 and 72, the sides walls 14 and 16 also include openable and closable openings 94 through which sufficient quantities of air may be pumped into the plenums 18 and 20 to provide the desired air cushion for supporting the vehicle 10 above water or above land while under repairs preventing the air cushion air from being provided by the engines 52 and 54.

Referring now more specifically to FIGS. 3, 4, 5, 6 and 7 of the drawings, it will be seen that the bottom structure 22 includes spaced upper and lower plates 98 and 100 having suitable bracing members 102 extending longitudinally of the body 12 secured therebetween. In addition, crossed pairs of opposing channel members 104 and 106 are disposed between the plates 98 and 100 and define four air plenums 108 therebetween which extend diagonally between opposite corners of the body 12. The plenums 108 cross and intersect with each other and the opposite ends of the plenums 108 are communicated with the lower ends of the plenums 18 and 20 through openings 110 formed in the plate 98, the openings 110 being selectively closable by means of flap-type doors 112 under the control of hydraulic cylinders 114. Accordingly, air ducted into the plenums 18 and 20 from the engines 52 and 54 may be variably admitted into the lower plenums 108.

The lower plate 100 has a plurality of elongated air impervious and flexible strips 118 supported therefrom with the longitudinal edges of the strips 118 sealed relative to the underside of the bottom plate 100. The strips 118 have small diameter air outlet openings 120 formed therethrough at points spaced longitudinally therealong and transversely thereacross and the opposite ends of the strips 118 are sealed relative to the bottom plate 100. The bottom plate includes a plurality of air outlet openings 122 formed therethrough based along each of the air plenums 108 and opening down into the base above the strips 118. Above each opening 122 is supported a cylindrical valve body 124 having an inlet opening 126 formed therein and a spring urged stem supported valve member 128 operatively associated with the openings 126. The valve member 128 is freely shiftable against its associated spring toward the open position in response to air under pressure being supplied to the opening 126 closable by the valve member 128 from above. However, when air under pressure is not supplied to the opening 126 from above, the spring associated with the valve 128 urges the latter to an upper position in order to close the opening 126. Further, the strips 118, when not being inflated by air pressure applied thereto from above through the openings 122, lie flat under the undersurface of the lower plate 100 and seal the lower ends of the openings 122.

It may be seen from FIG. 7 of the drawings that the space between adjacent plenums 108 and between adjacent braces 102 is filled with buoyant material 130. In addition, the strip areas of the lower plate 100 defined between each pair of adjacent strips 118 have elongated flexible and air impervious strips 132 secured therein with the longitudinal edges of the strips 132 sealed relative to the bottom plate 100 and the ends of the strips 132 also sealed relative to the bottom plate 100. The medial portions of the strips 132 include downwardly facing friction pad members 134 and air supply pipes 136 extend downwardly through the bottom structure including the plates 98 and 100 and include discharge ends opening into the areas above the strips 132 for inflating the latter. The upper ends of the pipes 136 are communicated with a manifold pipe 138 to which air under pressure may be controllably supplied from a suitable source 140 of air under pressure, the source 140 comprising a compressed air tank to which compressed air may be supplied from an air compressor 142 housed within the interior of the body 12.

It will be noted from FIG. 6 of the drawings that the strips 132 may be downwardly inflated past the strips 118 even when the latter are in flated and that the brake pads 134 carried by the strips 132 may therefore engage the ground surface 146 over which the vehicle 10 is supported by means of an air cushion in order to brake the vehicle 10 relative to the ground 146.

The strips 132 are confined to the front and rear ends of the longitudinal areas extending between adjacent strips 118. In this manner, selective supply of air to the various pipes 136 may provide a controlled braking of the vehicle 10.

The rear of the upper wall 24 includes an access opening 150 formed therein closed by vertically swingable doors 152 and 154 and the bow structure 68 may, as a whole, be hingedly supported from the remainder of the body 12 whereby the structure 68 may also define a loading ramp. Further, the engines 52 and 54 include bypass air flaps 156 which are open when the vehicle is in flight and the interior of the body below the doors 152 and 154 may include an elevator structure whereby weapons, normally housed within the body 12, may be raised into operative position through the opening 150 when the vehicle is not in flight, the flaps 156 of engines 52 and 54 being closed when air under pressure is to be ducted into plenums 18 and 20.

From the foregoing, it will be apparent that the vehicle 10 is capable of flight through the air, air cushion support over water and air cushion support over land. The doors 74 may be opened when the flap 50 is closed and the engines 60 and 62 are idled in order to allow some of the bypass air from the engines 52 and 54 to propel the vehicle rearwardly. In addition, combined usage of the doors may allow lateral movement as well as angular movement of the vehicle 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In an air cushion support system of the type including a rigid vehicle body, bottom means defining a plurality of parallel, elongated and horizontal downwardly projecting bottom surface members defining downwardly opening channels therebetween, said bottom means including a plurality of elongated horizontal flexible inflatable members disposed and extending along between pairs of adjacent bottom surface members, said body including means operative to apply fluid under pressure to said inflatable members to inflate the latter, said inflatable members, when inflated, including portions projected downwardly below said bottom surface members, the undersurfaces of said inflatable member portions including means defining friction brake surfaces, said vehicle further including means operative to downwardly discharge air under pressure below and between said bottom surface members for buoying said vehicle on a cushion of air beneath said bottom means, said body comprising a central fuselage of an aircraft having opposite side outwardly projecting horizontal wing structures extending generally transverse to said bottom surface members, said fuselage being generally rectangular in plan shape and including an upwardly longitudinally arched upper wall, said upper wall including a plurality of transversely spaced upwardly projecting supports spaced intermediate the front and rear ends thereof, a stationary transverse upper wing member supported from and extending between said upwardly projecting supports, a plurality of turbofan engines supported from said fuselage between pairs of adjacent upwardly projecting supports, said upper wing including a trailing edge downwardly swingable flap for closing the rear ends of the spaces between pairs of adjacent upwardly projecting supports and thus blocking the rearward discharge of said engines.

2. The combination of claim 1 wherein said bottom surface members comprise downwardly transversely convex second inflatable members, said vehicle also including means operative to apply air under pressure to said second inflatable members.

3. The combination of claim 1 wherein said means operative to downwardly discharge air under pressure includes a plurality of outlet openings formed in and spaced along said second inflatable members.

4. In an air cushion support system of the type including a rigid vehicle body, bottom means defining a plurality of parallel, elongated and horizontal downwardly projecting bottom surface members defining downwardly opening channels therebetween, said bottom means including a plurality of elongated horizontal flexible inflatable members disposed and extending along between pairs of adjacent bottom surface members, said body including means operative to apply fluid under pressure to said inflatable members to inflate the latter, said inflatable members, when inflated, including portions projected downwardly below said bottom surface members, the undersurfaces of said inflatable member portions including means defining friction brake surfaces, said vehicle further including means operative to downwardly discharge air under pressure below and between said bottom surface members for buoying said vehicle on a cushion of air beneath said bottom means, said body comprising a central fuselage of an aircraft having opposite side outwardly projecting horizontal wing structures extending generally transverse to said bottom surface members, said fuselage being generally rectangular in plan shape and including an upwardly longitudinally arched upper wall, said upper wall including a plurality of transversely spaced upwardly projecting supports spaced intermediate the front and rear ends thereof, a stationary transverse upper wing member supported from and extending between said upwardly projecting supports, a plurality of turbofan engines supported from said fuselage between pairs of adjacent upwardly projecting supports, said fuselage including hollow opposite side walls into which at least a portion of the bypass air from two of said engines is ducted, said means operative to apply fluid under pressure to said inflatable members comprises means in said fuselage operative to communicate said inflatable members with the interiors of said hollow side walls.

5. In an air cushion support system of the type including a rigid vehicle body having a bottom structure, said bottom structure including a rigid bottom plate, a plurality of parallel, elongated and horizontal downwardly projecting inflatable bottom surface members supported from and disposed beneath said bottom plate, said plate being elongated and said bottom surface members extending longitudinally of said plate, means defining crossed and intersecting horizontal air plenums above said bottom plate, air supply means operative to supply air under pressure into said air plenums, each of said air plenums crossing each of said inflatable bottom surface members in vertical registry therewith, and air transfer means communicating those portions of said bottom surface members crossed by said air plenums with the interiors of said plenums for inflation of the bottom surface members by air supplied thereto from said plenums.

6. The combination of claim 5 wherein said body includes hollow opposite side walls to which air is supplied under pressure from said air supply means, and means operative to variably communicate the opposite ends of said side walls with the interiors of the adjacent ends of said plenums.

7. The combination of claim 5 wherein said bottom surface members have openings formed therethrough opening in downward directions through which air supplied to said bottom surface members may be downwardly discharged therefrom for forming a vehicle supporting air cushion beneath said bottom structure.

8. The combination of claim 5 wherein said air transfer means includes air passages whose outlet ends open down into said bottom surface members, said bottom surface members, when not inflated, being sealable across the outlet ends of said air passages.

9. The combination of claim 5 wherein said bottom surface members define downwardly opening channels therebetween, and bottom structure including a plurality of elongated horizontal flexible inflatable members, disposed and extending along pairs of adjacent bottom surface members, said body including means operative to apply fluid under pressure to said inflatable members to inflate the latter, said inflatable members, when inflated, including portions projected downwardly below said bottom surface members, the undersurfaces of said inflatable member portions including means defining friction brake surfaces, said vehicle further including means operative to downwardly discharge air under pressure below and between said bottom surface members for buoying said vehicle on a cushion of air beneath said bottom means.

10. In an air cushion support system of the type including a rigid vehicle body, bottom means defining a plurality of parallel, elongated and horizontal downwardly projecting bottom surface members defining downwardly opening channels therebetween, said bottom means including a plurality of elongated horizontal flexible inflatable members disposed and extending along between pairs of adjacent bottom surface members, said body including means operative to apply fluid under pressure to said inflatable members to inflate the latter, said inflatable members, when inflated, including portions projected downwardly below said bottom surface members, the undersurfaces of said inflatable member portions including means defining friction brake surfaces, said vehicle further including means operative to downwardly discharge air under pressure below and between said bottom surface members for buoying said vehicle on a cushion of air beneath said bottoms means, a plurality of turbofan engines supported from said body for propelling the same, said body being generally rectangular in plan shape and including hollow opposite side walls into which at least a portion of the bypass air of two of said engines is ducted, said means operative to apply fluid under pressure to said inflatable members comprising means in said fuselage operative to communicate said inflatable members with the interiors of said hollow side walls.

11. The combination of claim 10 wherein said body comprises a central fuselage of an aircraft having opposite side outwardly projecting horizontal wing structures extending generally transverse to said bottom surface members.

12. The combination of claim 11 wherein said fuselage includes an upwardly longitudinally arched upper wall.

13. The combination of claim 12 wherein said upper wall includes a plurality of transversely spaced upwardly projecting supports spaced intermediate the front and rear ends thereof, and a stationary transverse upper wing member supported from and extending between said upwardly projecting supports.

14. The combination of claim 13 wherein said turbofan engines are supported from said fuselage between pairs of adjacent upwardly projecting supports.

* * * * *